(12) United States Patent
Li et al.

(10) Patent No.: US 12,019,206 B1
(45) Date of Patent: Jun. 25, 2024

(54) SIMULATION DEVICE AND SIMULATION METHOD FOR LIQUID SULFUR-GAS-WATER MULTIPHASE FLOW AND USE THEREOF IN HIGH-TEMPERATURE AND HIGH-PRESSURE GAS RESERVOIR WITH HIGH SULFUR CONTENT

(71) Applicants: Peking University, Beijing (CN); China University of Petroleum (East China), Qingdao (CN)

(72) Inventors: Tong Li, Beijing (CN); Yongsheng Ma, Beijing (CN); Caili Dai, Qingdao (CN); Guang Zhao, Qingdao (CN); Qian Li, Qingdao (CN); Daqian Zeng, Qingdao (CN); Ning Sun, Qingdao (CN)

(73) Assignees: Peking University, Beijing (CN); China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/392,659

(22) Filed: Dec. 21, 2023

(30) Foreign Application Priority Data

Nov. 1, 2023 (CN) .......................... 202311446500.3

(51) Int. Cl.
*G01V 9/00* (2006.01)
*G01N 15/04* (2006.01)
*G01N 15/08* (2006.01)
*G01N 21/03* (2006.01)

(52) U.S. Cl.
CPC ............. *G01V 9/005* (2013.01); *G01N 15/04* (2013.01); *G01N 15/08* (2013.01); *G01N 21/03* (2013.01)

(58) Field of Classification Search
CPC ......... G01V 9/005; G01N 15/04; G01N 15/08
See application file for complete search history.

(56) References Cited

U.S. PATENT DOCUMENTS

| | | | | |
|---|---|---|---|---|
| 7,829,032 | B2* | 11/2010 | Van Dam | B01J 19/0093 422/159 |
| 8,071,035 | B2* | 12/2011 | Elizarov | C07H 5/02 422/600 |
| 8,173,073 | B2* | 5/2012 | Elizarov | B01J 19/0093 422/129 |
| 10,969,514 | B1* | 4/2021 | Hou | G01V 3/32 |
| 11,530,973 | B1* | 12/2022 | Guo | G01N 15/0826 |
| 2004/0255649 | A1* | 12/2004 | Zougari | G01N 33/2823 73/61.62 |

(Continued)

OTHER PUBLICATIONS

"An experimental study on gas-liquid sulfur two-phase flow in ultradeep high-sulfur gas reservoirs", Gu Shaohua, Shi Zhiliang, Hu Xiangyang, Shi Yunqing, Qin Shijiang & Guo Xiao; Natural Gas Industry, Oct. 2018, pp. 70-75.

(Continued)

*Primary Examiner* — Nathaniel T Woodward
*Assistant Examiner* — Philip L Cotey
(74) *Attorney, Agent, or Firm* — Calfee, Halter & Griswold LLP

(57) ABSTRACT

The present discloses a simulation device and simulation method for liquid sulfur-gas-water multiphase flow and use thereof in a high-temperature and high-pressure gas reservoir with high sulfur content.

15 Claims, 8 Drawing Sheets

(56) References Cited

U.S. PATENT DOCUMENTS

| | | | |
|---|---|---|---|
| 2008/0233018 A1* | 9/2008 | van Dam | B01J 19/0093 536/124 |
| 2009/0036668 A1* | 2/2009 | Elizarov | C07H 5/02 536/122 |
| 2011/0097245 A1* | 4/2011 | Elizarov | C07H 5/02 422/159 |
| 2014/0120537 A1* | 5/2014 | Chang | B01L 3/502753 435/6.12 |
| 2015/0024436 A1* | 1/2015 | Eberhart | G01N 27/44734 204/601 |
| 2017/0082551 A1* | 3/2017 | Mackay | B01L 3/5027 |
| 2020/0003745 A1* | 1/2020 | Saini | B03C 1/282 |
| 2020/0222905 A1* | 7/2020 | Hill | B01L 3/502784 |
| 2022/0381669 A1* | 12/2022 | Guo | G01N 15/0826 |

OTHER PUBLICATIONS

"Effect of Liquid Sulfur Adsorption on Mining Dynamics of High Sulfur Gas Reservoirs", Chen Qi, Oil and Gas Field Development Engineering, May 2019, Southwest Petroleum University Master's thesis.

"Study on Seepage Regularity of Gas-Liquid Sulfur in High Sulfur Content Gas Reservoir", He Linji, Oil and Gas Field Development Engineering, May 2017, Southwest Petroleum University Master's thesis. China.

* cited by examiner

SIMULATION DEVICE AND SIMULATION METHOD FOR LIQUID SULFUR-GAS-WATER MULTIPHASE FLOW AND USE THEREOF IN HIGH-TEMPERATURE AND HIGH-PRESSURE GAS RESERVOIR WITH HIGH SULFUR CONTENT

CROSS-REFERENCE TO RELATED APPLICATIONS

The application claims the benefit of Chinese Application No. 202311446500.3, filed on Nov. 1, 2023, entitled "SIMULATION DEVICE AND SIMULATION METHOD FOR LIQUID SULFUR-GAS-WATER MULTIPHASE FLOW AND USE THEREOF IN HIGH-TEMPERATURE AND HIGH-PRESSURE GAS RESERVOIR WITH HIGH SULFUR CONTENT", the contents of which is specifically and entirely incorporated herein by reference.

FIELD

The present disclosure relates to the field of exploration and development of oil and natural gas, and particularly to a simulation device and simulation method for liquid sulfur-gas-water multiphase flow and use thereof in high-temperature and high-pressure gas reservoir with high sulfur content.

BACKGROUND

China has abundant resources of natural gas with high sulfur content, which is mainly distributed in the Sichuan Basin in southwest China, and has a total amount of more than $1\times10^{12}$ m$^3$, thus the development potential is enormous. Compared with the existing natural gas reservoir, the gas reservoir with high sulfur content suffers from precipitation of elemental sulfur during the development process due to the decreased dissolving capacity of elemental sulfur in acid gas as the reservoir pressure is reduced. For deep or ultra-deep reservoir strata, the temperature of reservoir strata is generally higher than the melting point (119° C.) of sulfur, so that the elemental sulfur is precipitated in a liquid state, on one hand, the elemental sulfur is deposited in pores or throats through adsorption to block gas seepage channels and reduce the permeability of the reservoir stratum; on the other hand, the deposited sulfur forms a mobile phase through aggregation, and forms two-phase seepage with gas, so that the effective permeability of the gas phase is reduced, thereby decreasing the gas well capacity, and affecting the development effect of the gas reservoir. In addition, when the gas reservoir development enters the middle and later stages, the water invasion phenomenon causes increased water content in the stratum, and the liquid sulfur-gas-water three-phase seepage occurs, whose flow mechanism is complex. Multiphase flow interaction in gas reservoirs with high sulfur content controls the natural gas extraction process in the development process, wherein whether the liquid sulfur has an influence on the production process under high-temperature and high-pressure conditions has been a pending scientific problem for many years.

At present, the research targeting the gas-liquid sulfur-water three-phase seepage of the deep and ultra-deep gas reservoir strata with high sulfur content has not been reported. In the existing art, a small amount of experimental research aiming at the gas-liquid sulfur two-phase seepage has been carried out.

Gu Shaohua, et al. (refer to Gu Shaohua, Shi Zhiliang, Hu Xiangyang, et al., "An Experimental Study on Gas-liquid Sulfur Two-phase Flow in Ultradeep High-sulfur Gas Reservoirs" [J], *NATURE GAS INDUSTRY*, 2018, Vol. 38, Issue 10, pp. 70-75) carried out the two-phase displacement experiment of gas-liquid sulfur under the conditions of high-temperature and high-pressure, and processed the experimental data of relative permeability based on the non-steady state method to plot a gas-liquid sulfur relative permeability curve.

Chen Qi ("Study on the Effect of Liquid Sulfur Adsorption of Gas Reservoirs with High Sulfur Content on the Reservoir Stratum" [D]. Southwest Petroleum University, 2019) selected rock cores with different porosities and permeabilities, and carried out the gas-liquid sulfur two-phase seepage experiments under the conditions of altered stress, and obtained a gas-liquid sulfur relative permeability curve under different confining pressure conditions by adopting the non-steady state method.

He Linji ("Study on the Law of Gas-Liquid Sulfur Seepage in Gas Reservoirs with High Sulfur Content" [D]. Southwest Petroleum University, 2017) carried out experimental tests under different temperature and stress-sensitive conditions and plotted a gas-liquid sulfur two-phase relative permeability curve according to the non-steady state method.

To sum up, a few experimental studies related to liquid sulfur seepage have been reported at present due to the limitation of the experimental conditions, and the experimental studies are mainly targeted at the gas-liquid sulfur two-phase seepage experiments. The multi-phase flow behavior under the liquid sulfur-gas-water coexistence state under the real medium space constraint of the gas reservoir stratum with high sulfur content has not been reported, such that the high-efficiency development of the gas reservoirs with high sulfur content and the research progress of the sulfur control and treatment are greatly restricted.

Therefore, it has important significance to research and develop a simulation method and simulation device for liquid sulfur-gas-water multiphase flow of the high-temperature and high-pressure gas reservoir with high sulfur content.

SUMMARY

The present disclosure aims to provide a simulation device and simulation method for liquid sulfur-gas-water multiphase flow and use thereof in a high-temperature and high-pressure gas reservoir with high sulfur content, the method can overcome the difficult problem that the whole flow process of liquid sulfur needs to be kept under the high-temperature, high-pressure and safe environment through high-precision visualized micro-fluidic control, and reproduce the multi-phase flow behavior under the constraints of the actual porous medium structure and the in-situ reservoir stratum high-temperature and high-pressure conditions during the three-phase coexistence of liquid sulfur-gas-water, and can provide a theoretical basis for the efficient development of the gas reservoir with high sulfur content.

In order to achieve the above object, the first aspect of the present disclosure provides a simulation device for liquid sulfur-gas-water multiphase flow comprising an injection unit, a high-temperature high-pressure visible reaction kettle 19, and a data acquisition unit;

the injection unit comprises an intermediate container, the intermediate container comprising a sulfur intermediate container 5, a water intermediate container 6, and a gas intermediate container 7;

the high-temperature high-pressure visible reaction kettle 19 comprises a microfluidic chip 18, and the high-temperature high-pressure visible reaction kettle 19 is connected with one end of the intermediate connector through a three-way valve G 17, to inject the fluid of the intermediate connector into the microfluidic chip 18 through a connecting pipeline;

the data acquisition unit comprises a high-speed camera 15 arranged right above the high-temperature high-pressure visible reaction kettle 19, and a computer 24 connected with the high-speed camera 15, in order to observe the fluid changes in the microfluidic chip 18 with real-time imaging.

The second aspect of the present disclosure provides a simulation method performed in the aforementioned simulation device for liquid sulfur-gas-water multiphase flow comprising:

a first simulation method:

(1) production of a microfluidic chip 18:

1) manufacturing a casting body slice by extracting a core rock sample from an actual reservoir stratum, and extracting a pore crack structure through microscope imaging;

2) etching the microfluidic chip according to the pore crack structure to produce a glass plate etching microscopic model;

3) gluing the other glass plate having an injection hole and a fluid extraction hole through vacuum bonding to obtain a microfluidic chip 18 representing a real reservoir pore structure;

(2) saturating the liquid sulfur in the microfluidic chip 18:

placing the microfluidic chip 18 in a high-temperature high-pressure visible reaction kettle 19, filling a sulfur intermediate container 5 with sulfur powder, heating and melting the sulfur powder to a liquid sulfur state, and injecting the liquid sulfur into the microfluidic chip 18 at high temperature until the liquid sulfur is saturated;

(3) cleaning the pipeline with nitrogen gas:

closing the connection route of the microfluidic chip 18 and the three-way valve 17, and simultaneously opening the branch on the other side, so that the three-way valve 17 is in direct communication with the back-pressure valve 21; nitrogen gas in the gas intermediate container 7 bypasses the microfluidic chip 18 along the branch and through the three-way valve 17, and directly flows into a recovery device 22 through the back-pressure valve 21 to clean the residual liquid sulfur in the processing pipeline until no liquid sulfur is generated in the recovery device 22; in order to avoid the influence of the liquid sulfur in the pipeline on the sulfur saturation in the micro-fluid control chip 18 when the liquid sulfur is displaced by nitrogen gas;

(4) simulation of gas drive liquid sulfur:

adjusting a three-way valve 17, such that the three-way valve 17 is in communication with the microfluidic chip 18, injecting nitrogen gas into the microfluidic chip 18, and acquiring a simulated state of gas-liquid sulfur two-phase flow through a high-speed camera 15;

(5) washing the pipeline with water:

closing the connection route of the three-way valve 17 and the microfluidic chip 18, and simultaneously opening the branch on the other side, so that the three-way valve 17 is in direct communication with the back-pressure valve 21; the water in the water intermediate container 6 bypasses the microfluidic chip 18 along the branch and through the three-way valve 17, and directly flows into a recovery device 22 through the back-pressure valve 21 to clean the residual gas in the processing pipeline until no obvious bubble is generated in the recovery device 22; in order to avoid the influence of the residual gas in the pipeline on the gas-liquid sulfur saturation in the microfluidic chip 18 when the residual gas is displaced by water;

(6) liquid sulfur-gas-water three-phase simulation under the condition of driving the gas-liquid sulfur with water:

adjusting the three-way valve 17, such that the three-way valve 17 is in communication with the microfluidic chip 18, injecting distilled water into the microfluidic chip 18, and acquiring a simulated state of liquid sulfur-gas-water three-phase flow through the high-speed camera 15;

or, a second simulation method:

the method is performed after steps (1) to (3) of the first simulation method:

(7) liquid sulfur-gas-water three-phase flow simulation under the condition of gas-water alternate injection:

the step is performed after steps (1) to (3), alternately opening a water intermediate container 6 and a gas intermediate container 7 to carry out the gas-water alternate displacement until the stable state, and acquiring a simulated state of liquid sulfur-gas-water three-phase flow through the high-speed camera 15.

The third aspect of the present disclosure provides a method of using the aforementioned simulation method in the high-temperature and high-pressure gas reservoirs with high sulfur content.

Due to the technical scheme, the present disclosure has the following beneficial effects:

(1) The method realizes the liquid sulfur-containing three-phase visualized simulation method for the first time, observes the occurrence state of the liquid sulfur under high-temperature and high-pressure conditions and depicts the interaction process of the liquid sulfur with gas and water;

(2) The method is safe and feasible, the whole process is kept at the temperature range of 120-180° C. and the pressure range of 20-60 MPa, and reproduces the actual high-temperature and high-pressure conditions of the reservoir stratum;

(3) The outlet of the device is provided with a sulfur recovery measuring cylinder and an alkali liquor so that the smoothness, safety, and environmental protection of the experiments are ensured;

(4) The device clearly defines the tracking errors of the internal environment pressure and the injection pressure of the high-temperature high-pressure kettle;

(5) The arrangement of cleaning pipelines in the device has the advantages that the pipeline can be washed in the heat-preservation and pressure-maintaining experiment process, the steps are not influenced by each other, and the experiment is more accurate.

DESCRIPTION OF REFERENCE SIGNS

Figure 1:
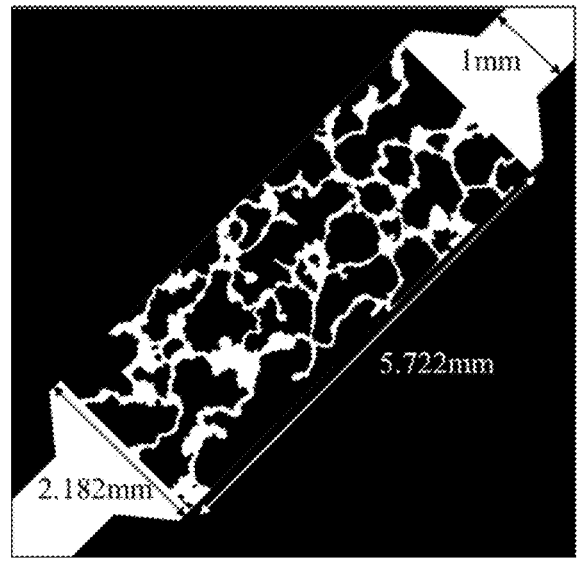
FIG. 1 illustrates a schematic diagram of the geometric morphology of an etched pore structure in Example 1 of the present disclosure.

1: ISCO constant speed and constant pressure pump;
2: Valve A;
3: Valve B;
4: Valve C;
5: Sulfur intermediate container;
6: Water intermediate container;
7: Gas intermediate container;
8: Valve D;
9: Valve E;
10: Valve F;
11: Thermostatic heater A;
12: Ring pressure tracking pump;
13: Pressure gauge A;
14: Pressure gauge B;
15: High-speed camera;
16: Pressure gauge C;
17: Three-way valve G;
18 Microfluidic chip;
19: High-temperature high-pressure visible reaction kettle;
20: LED lamp;
21: Back-pressure valve;
22: Fluid recovery device;
23: Thermostatic heater B;
24: Computer;
25: Pressure gauge D;
26: Tail gas treatment bottle;
27: Back pressure pump.

DETAILED DESCRIPTION

The terminals and any valve of the ranges disclosed herein are not limited to the precise ranges or values, such ranges or values shall be comprehended as comprising the values adjacent to the ranges or values. As for numerical ranges, the endpoint values of the various ranges, the endpoint values and the individual point valve of the various ranges, and the individual point values may be combined with one another to produce one or more new numerical ranges, which should be deemed have been specifically disclosed herein.

As described above, the first aspect of the present disclosure provides a simulation device for liquid sulfur-gas-water multiphase flow comprising an injection unit, a high-temperature high-pressure visible reaction kettle 19, and a data acquisition unit;

the injection unit comprises an intermediate container, the intermediate container comprising a sulfur intermediate container 5, a water intermediate container 6, and a gas intermediate container 7;

the high-temperature high-pressure visible reaction kettle 19 comprises a microfluidic chip 18, and the high-temperature high-pressure visible reaction kettle 19 is connected with one end of the intermediate connector through a three-way valve G 17, to inject the fluid of the intermediate connector into the microfluidic chip 18 through a connecting pipeline;

the data acquisition unit comprises a high-speed camera 15 arranged right above the high-temperature high-pressure visible reaction kettle 19, and a computer 24 connected with the high-speed camera 15, to observe the fluid changes in the microfluidic chip 18 with real-time imaging.

The inventors of the present disclosure found that an injection pump and three intermediate containers are used for implementing the displacement process of multi-phase fluid, controlling the temperature, the pressure, and the injection flow rate; the high-speed camera 15 is used for observing and acquiring the three-phase flow characteristics in a microfluidic chip 18 in the real-time and dynamic manner, and the image processing is performed for analyzing parameters (e.g., a contact angle, an occurrence mode) in the liquid sulfur-gas-water three-phase micro-flow process to obtain the microcosmic seepage characteristics.

Furthermore, on one hand, the present disclosure ensures the high temperature condition of the whole process through the thermostatic heater and the heating and heat preservation belt, and realizes the reproduction of the flowing state of the liquid sulfur in an actual formation; on the other hand, a pipeline cleaning device in the experiment process is arranged, the heat-preservation and pressure-maintaining experiment pipeline is cleaned, all steps are not influenced mutually, and the experiment is more accurate; the ring pressure tracking system ensures that not only a high-pressure environment can be realized, but also the microfluidic chip is prevented from being crushed; finally, the real-time monitoring of the whole process is implemented by a high-speed camera, it can reproduce the multi-phase flow behavior under the constraints of the actual porous medium structure and the in-situ reservoir stratum high-temperature and high-pressure conditions during the three-phase coexistence of liquid sulfur-gas-water, and can provide a theoretical basis for the efficient development of the gas reservoir with high sulfur content.

In addition, the tail end of the device is provided with a tail gas treatment device, which can ensure the safety and environmental protection of the whole experiment process.

According to the present disclosure, the injection unit further comprises an ISCO constant speed and constant pressure pump 1, and the ISCO constant speed and constant pressure pump 1 is connected with the other end of the intermediate container for performing the constant speed and constant pressure control on the pressure and flow rate of the fluid in the intermediate container.

According to the present disclosure, the bottoms of the sulfur intermediate container 5, the water intermediate container 6, and the gas intermediate container 7 are provided with a valve D 8, a valve E 9, and a valve F 10 respectively, the valve D 8, the valve E 9 and the valve F 10 are respectively connected with the ISCO constant speed and constant pressure pump 1.

According to the present disclosure, the tops of the sulfur intermediate container 5, the water intermediate container 6, and the gas intermediate container 7 are provided with a valve A 2, a valve B 3 and a valve C 4 respectively, the valve A 2, the valve B 3 and the valve C 4 are connected with the three-way valve G 17.

According to the present disclosure, the three-way valve G 17 is embedded in the high-temperature high-pressure visible reaction kettle 19.

According to the present disclosure, the intermediate container and the connecting pipeline are disposed in a thermostatic heater A 11.

According to the present disclosure, the simulation device further comprises an annular pressure unit connected with an annular pressure inlet end of the high-temperature high-pressure visible reaction kettle 19, the annular pressure unit provides the high-temperature high-pressure visible reaction kettle 19 with an annular pressure.

According to the present disclosure, the annular pressure unit comprises a ring pressure tracking pump 12 and a pressure gauge, the pressure gauge is disposed on a connecting pipeline between the ring pressure tracking pump 12 and the high-temperature high-pressure visible reaction kettle 19.

According to the present disclosure, the pressure gauge includes a pressure gauge A 13, a pressure gauge B 14, and a pressure gauge C 16.

According to the present disclosure, the simulation device further comprises a back-pressure valve 21 connected with the microfluidic chip 18; a back pressure pump 27 is disposed at the other end of the back-pressure valve 21, and a pressure gauge D 25 is arranged on a pipeline connecting the back-pressure valve 21 with the back pressure pump 27, wherein the pressure gauge D 25 is used for collecting and monitoring the back pressure.

According to the present disclosure, an outlet of the back-pressure valve 21 is provided with a fluid recovery device 22, and the fluid recovery device 22 is used for metering the volume and/or mass of the outlet-end fluid.

According to the present disclosure, the fluid recovery device 22 is connected to a tail gas treatment bottle 26 through a pipeline.

According to the present disclosure, the back-pressure valve 21 and the fluid recovery device 22 are disposed in a thermostatic heater B 23.

According to the present disclosure, the data acquisition unit further comprises an LED light source 20 disposed directly below the high-temporal high-pressure visible reaction kettle 19.

According to the present disclosure, the high-temperature high-pressure visible reaction kettle 19 further comprises a chip holder, an electric heating system, a temperature sensor, a heat conduction inner cavity, and a heat preservation outer cavity.

According to the present disclosure, the microfluidic chip 18 is fixed in the heat-conducting inner cavity through the chip holder.

According to the present disclosure, the heat conduction inner cavity and the heat preservation outer cavity are provided with the electric heating system therein, and the electric heating system is connected to the computer 24 through the temperature sensor to monitor temperature change in real-time.

The second aspect of the present disclosure provides a simulation method performed in the aforementioned simulation device for liquid sulfur-gas-water multiphase flow comprising:

a first simulation method:
(1) production of a microfluidic chip 18:
  1) manufacturing a casting body slice by extracting a core rock sample from an actual reservoir stratum, and extracting a pore crack structure through microscope imaging;
  2) etching the microfluidic chip according to the pore crack structure to produce a glass plate etching microscopic model;
  3) gluing the other glass plate having an injection hole and a fluid extraction hole through vacuum bonding to obtain a microfluidic chip 18 representing a real reservoir pore structure;
(2) saturating the liquid sulfur in the microfluidic chip 18:
  placing the microfluidic chip 18 in a high-temperature high-pressure visible reaction kettle 19, filling a sulfur intermediate container 5 with sulfur powder, heating and melting the sulfur powder to a liquid sulfur state, and injecting the liquid sulfur into the microfluidic chip 18 at high temperature until the liquid sulfur is saturated;
(3) cleaning the pipeline with nitrogen gas:
  closing the connection route of the microfluidic chip 18 and the three-way valve 17, and simultaneously opening the branch on the other side, so that the three-way valve 17 is in direct communication with the back-pressure valve 21; nitrogen gas in the gas intermediate container 7 bypasses the microfluidic chip 18 along the branch and through the three-way valve 17, and directly flows into a recovery device 22 through the back-pressure valve 21 to clean the residual liquid sulfur in the processing pipeline until no liquid sulfur is generated in the recovery device 22, to avoid the influence of the liquid sulfur in the pipeline on the sulfur saturation in the micro-fluid control chip 18 when the liquid sulfur is displaced by nitrogen gas;
(4) simulation of gas drive liquid sulfur:
  adjusting a three-way valve 17, such that the three-way valve 17 is in communication with the microfluidic chip 18, injecting nitrogen gas into the microfluidic chip 18, and acquiring a simulated state of gas-liquid sulfur two-phase flow through a high-speed camera 15;
(5) washing the pipeline with water:
  closing the connection route of the three-way valve 17 and the microfluidic chip 18, and simultaneously opening the branch on the other side, so that the three-way valve 17 is in direct communication with the back-pressure valve 21; the water in the water intermediate container 6 bypasses the microfluidic chip 18 along the branch and through the three-way valve 17, and directly flows into a recovery device 22 through the back-pressure valve 21 to clean the residual gas in the processing pipeline until no obvious bubble is generated in the recovery device 22, to avoid the influence of the residual gas in the pipeline on the gas-liquid sulfur saturation in the microfluidic chip 18 when the residual gas is displaced by water;

(6) liquid sulfur-gas-water three-phase simulation under the condition of driving the gas-liquid sulfur with water:

adjusting the three-way valve 17, such that the three-way valve 17 is in communication with the microfluidic chip 18, injecting distilled water into the microfluidic chip 18, and acquiring a simulated state of liquid sulfur-gas-water three-phase flow through the high-speed camera 15;

or, a second simulation method:

the method is performed after steps (1) to (3) of the first simulation method:

(7) liquid sulfur-gas-water three-phase flow simulation under the condition of gas-water alternate injection:

the step is performed after steps (1) to (3), alternately opening a water intermediate container 6 and a gas intermediate container 7 to carry out the gas-water alternate displacement until the stable state, and acquiring a simulated state of liquid sulfur-gas-water three-phase flow through the high-speed camera 15.

It shall be noted in the present disclosure that a simulation method for liquid sulfur-gas-water multiphase flow of the present disclosure includes two methods, wherein one simulation method includes step (1), step (2), step (3), step (4), step (5) and step (6); another simulation method includes step (1), step (2), step (3) and step (7); that is, each simulation experiment is carried out by selecting the steps (1) to (6); or the simulation experiment is performed by selecting the steps (1) to (3) and the step (7), both can produce the simulated state of the liquid sulfur-gas-water three-phase flow.

According to the present disclosure, the reservoir stratum sample may be derived from an actual carbonate downhole core or a natural outcrop core. Wherein the natural outcrops refer to the portions of the rock stratum exposed to the earth's surface.

In addition, the method for manufacturing the casting body slice in the present disclosure comprises the following processes: vacuum pouring, high-temperature high-pressure curing, sampling, grinding the slice, covering with the slice, and the like.

According to the present disclosure, the process of saturating the liquid sulfur in step (2) comprises:
1) maintaining all valves in a closed state, and keeping the three-way valve G 17 in communication with the microfluidic chip 18;
2) filling a sulfur intermediate container 5 with sulfur powder;
3) setting the pressure of the back-pressure valve 21 to be within a range of 25-60 MPa, and keeping the back pressure stable through real-time detection with the pressure gauge 25;
4) correlating the pressure of a high-temperature high-pressure visible reaction kettle controlled by the pressure gauge A 13 with the pressure of an injection end controlled by the pressure gauge B 14, and maintaining the pressure difference to be always less than 0.2 MPa;
5) controlling the temperature of the thermostatic heater A 11, the high-temperature high-pressure visible reaction kettle 19, and the thermostatic heater B 23 to be within a range of 120-180° C. and preserving the constant temperature for 3-6 hours;
6) sequentially opening the valve 8 and valve 2, starting the ISCO constant speed and constant pressure pump 1, injecting in a constant pressure mode, wherein the pressure set valve is 1-2 MPa lower than the back-pressure valve 21 in step 3); then switching to a constant speed injection mode, wherein the speed is set to be within a range of 0.05-0.1 mL/min;
7) switching on a high-speed camera 15, starting a video recording mode, observing the liquid sulfur saturation condition, terminating the liquid sulfur saturation by taking an indicator that there is no obvious bubble in the microfluidic chip 18, stopping the injection of said ISCO constant speed and constant pressure pump 1, and closing the valve 8 and the valve 2.

According to the present disclosure, the process of cleaning the pipeline with nitrogen gas in step (3) comprises:
1) keeping all settings in the state of step (2);
2) adjusting all valves to be in a closed state, adjusting the connection route of the three-way valve 17 and the microfluidic chip 18 to a closed state, and simultaneously opening the branch on the other side, so that the three-way valve 17 is in direct communication with the back-pressure valve 21; bypassing the microfluidic chip 18;
3) sequentially opening a valve 10 and a valve 4, starting the ISCO constant speed and constant pressure pump 1, injecting in a constant speed mode, and setting the speed to be within a range of 0.1-0.5 mL/min;
4) stopping the cleaning process until observing that there is no obvious generation of liquid sulfur in the liquid sulfur recovery device, closing the injection of the ISCO constant speed and constant pressure pump 1, and closing the valve 10 and the valve 4.

According to the present disclosure, the simulation process of the gas drive liquid sulfur in step (4) comprises:
1) keeping all settings in the state of step (3);
2) adjusting all valves to be in a closed state, and adjusting a three-way valve G 17 to be in communication with the microfluidic chip 18;
3) sequentially opening a valve 10 and a valve 4, starting the ISCO constant speed and constant pressure pump 1, injecting in a constant speed mode, and setting the speed to be within a range of 0.05-0.1 mL/min;
4) stopping the gas drive liquid sulfur simulation experiment upon detecting that the sulfur-containing saturation of the microfluidic chip 18 does not change by an image analysis means, closing the injection of the ISCO constant speed and constant pressure pump 1, closing the valve 10 and the valve 4, and obtaining the simulated state of gas-liquid sulfur two-phase flow.

According to the present disclosure, the process of washing the pipeline with water in step (5) comprises:
(1) keeping all settings in the state of step (4);
(2) adjusting all valves to be in a closed state, adjusting the connection route of the three-way valve 17 and the microfluidic chip 18 to a closed state, and simultaneously opening the branch on the other side, so that the three-way valve 17 is in direct communication with the back-pressure valve 21; bypassing the microfluidic chip 18;

(3) sequentially opening a valve 9 and a valve 3, starting the ISCO constant speed and constant pressure pump 1, injecting in a constant speed mode, and setting the speed to be within a range of 0.1-0.5 mL/min;

(4) stopping the cleaning process until observing that there is no obvious generation of bubbles in the liquid sulfur recovery device, closing the injection of the ISCO constant speed and constant pressure pump 1, and closing the valve 9 and the valve 3.

According to the present disclosure, the process of liquid sulfur-gas-water three-phase simulation under the condition of driving the gas-liquid sulfur with water in step (6) comprises:

1) keeping all settings in the state of step (5);
2) adjusting all valves to be in a closed state, and adjusting a three-way valve G 17 to be in communication with the microfluidic chip 18;
3) sequentially opening a valve 9 and a valve 3, starting the ISCO constant speed and constant pressure pump 1, injecting in a constant speed mode, and setting the speed to be within a range of 0.05-0.1 mL/min;
4) stopping the water drive liquid sulfur simulation experiment upon detecting that the sulfur-containing saturation of the microfluidic chip 18 does not change by an image analysis means, closing the ISCO constant speed and constant pressure pump 1, closing the valve 9 and the valve 3, and obtaining the simulated state of liquid sulfur-gas-water three-phase flow under the water drive gas-liquid sulfur condition.

According to the present disclosure, the process of liquid sulfur-gas-water three-phase flow simulation under the condition of gas-water alternate injection in step (7) comprises:

1) keeping all settings in the state of step (3);
2) adjusting all valves to be in a closed state, and adjusting a three-way valve G 17 to be in communication with the microfluidic chip 18;
3) sequentially opening a valve 10 and a valve 4, starting the ISCO constant speed and constant pressure pump 1, injecting in a constant speed mode, and setting the speed to be within a range of 0.05-0.1 mL/min;
4) after injection for 50-100 min, pausing the ISCO constant speed and constant pressure pump 1, sequentially closing valve 10 and valve 4, opening valve 9 and valve 3 in sequence, starting the ISCO constant speed and constant pressure pump 1, and injecting in a constant speed mode, and setting the speed to be within a range of 0.05-0.1 mL/min;
5) after injection for 50-100 min, pausing the injection of said ISCO constant speed and constant pressure pump 1, sequentially closing the valve 9 and the valve 3, opening the valve 10 and the valve 4 in sequence, starting the ISCO constant speed and constant pressure pump 1, and injecting in a constant speed mode, and setting the speed to be within a range of 0.05-0.1 mL/min;
6) circulating step (4) and step (5) in sequence, stopping the liquid sulfur-gas-water three-phase flow simulation experiment upon detecting that the sulfur-containing saturation of the microfluidic chip 18 does not change by an image analysis means, closing the ISCO constant speed and constant pressure pump 1, and closing all valves.

According to the present disclosure, the simulation method further comprises disassembling and reloading the microfluidic chip, specifically, the method for disassembling and reloading the microfluidic chip comprises the following steps:

(1) keeping all valves in a closed state, maintaining the connection route between the three-way valve G 17 and the microfluidic chip 18 in a closed state, simultaneously opening the branch on the other side, keeping the pump 12 in a running state, and maintaining the tracking error between the pressure gauge 13 and the pressure gauge 14 to be less than 0.1 MPa;
(2) closing the heating device of the high-temperature high-pressure visible reaction kettle 19, and carrying out the next operation when the temperature is reduced to below 40° C.;
(3) reducing the pressure of the back-pressure valve 21 at a depressurization rate of 1 MPa/10 min, then disassembling and reloading the microfluidic chip after the pressure of the back-pressure valve is completely released.

The third aspect of the present disclosure provides a use of the aforementioned simulation method in the high-temperature and high-pressure gas reservoirs with high sulfur content.

According to the present disclosure, the conditions of the high-temperature and high-pressure gas reservoirs with high sulfur content comprise: the temperature condition is within a range of 120-200° C., and the pressure condition is within a range of 1-60 MPa; preferably, the temperature is within a range of 120-180° C., and the pressure is within a range of 20-60 MPa.

The present disclosure will be described in detail below with reference to examples.

In the following examples:

the high-speed camera with the model number Phantom T1340 was purchased from Vision Research Inc. in the United States of America (USA);

the saturation parameter was measured by an image analysis method; the rock core slice material was prepared by coring the actual reservoir stratum. The raw material of the sulfur sample was high-purity sulfur powder which was commercially available from Shanghai Hushi Laboratory Equipment Co., Ltd., the purity was larger than 99.999%.

Example 1

Figure 2:
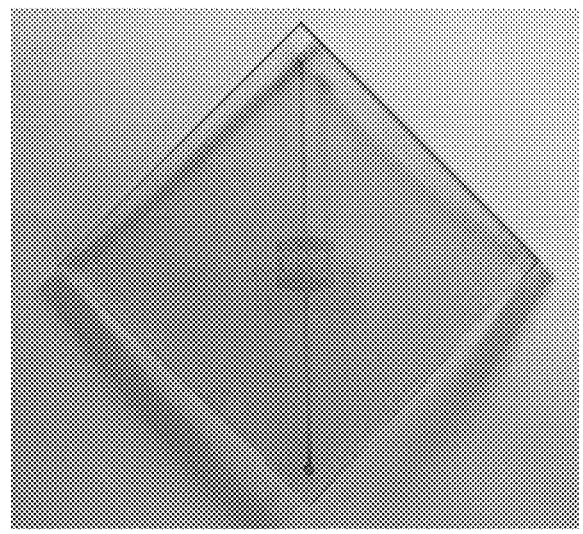
FIG. 2 illustrates a schematic diagram of the material object of an etched microfluidic chip in Example 1 of the present disclosure.
Figure 14:
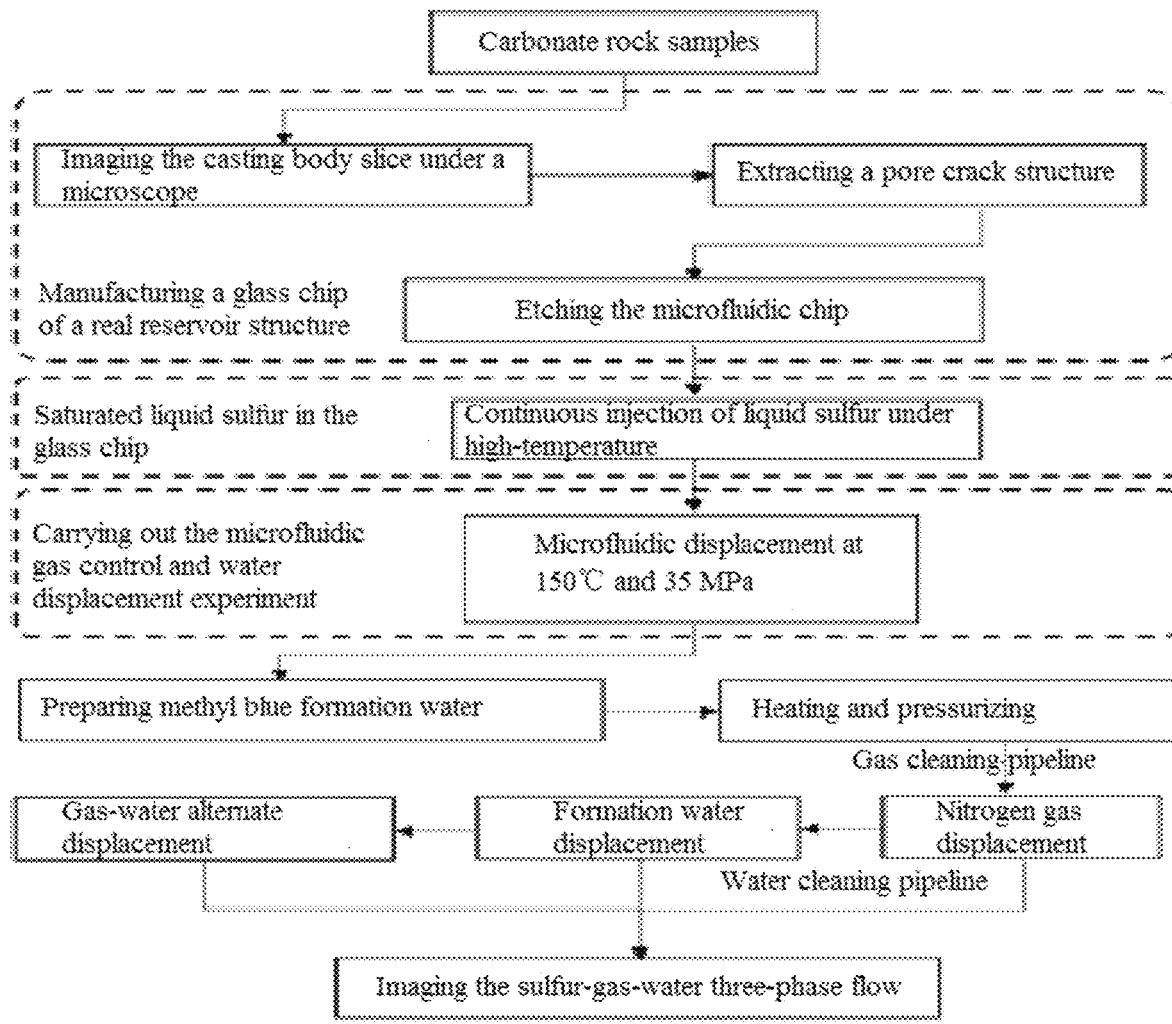
FIG. 14 is a schematic view showing the flowchart of the simulation method used in Example 1 of the present disclosure.

According to the flowchart schematic view of the simulation method in the present disclosure shown in FIG. 14, specifically, the simulation method comprised the following steps:

S1, production of a microfluidic chip:

(1) a rock core 1 of an actual reservoir stratum of the Puguang Gas Field in China was selected to produce a casting body slice to obtain a pore structure plan view as shown in FIG. 1, wherein FIG. 1 illustrated a schematic diagram of the geometric morphology of an etched pore structure in Example 1 of the present disclosure, as can be seen from FIG. 1, the carbonate rock reservoir stratum had a complex pore structure, and the pore throat size was mainly distributed in the range of 10-400 μm;
(2) the microfluidic chip had the dimensions of 75 mm×75 mm×3 mm, and the width of both the inlet end and the outlet end was 1 mm;
(3) the Borofloat-33 glass was selected to make a model, as shown in FIG. 2, wherein FIG. 2 illustrated a schematic diagram of the material object of an etched microfluidic chip in Example 1 of the present disclosure, wherein an etching region of the micro model was 5.722 mm×2.182 mm, the chip depth was an average size 50 µm of an actual pore structure, a pore throat size was distributed between 10 µm and 400 µm, and the minimum pore throat size was 10 µm.

Figure 3:
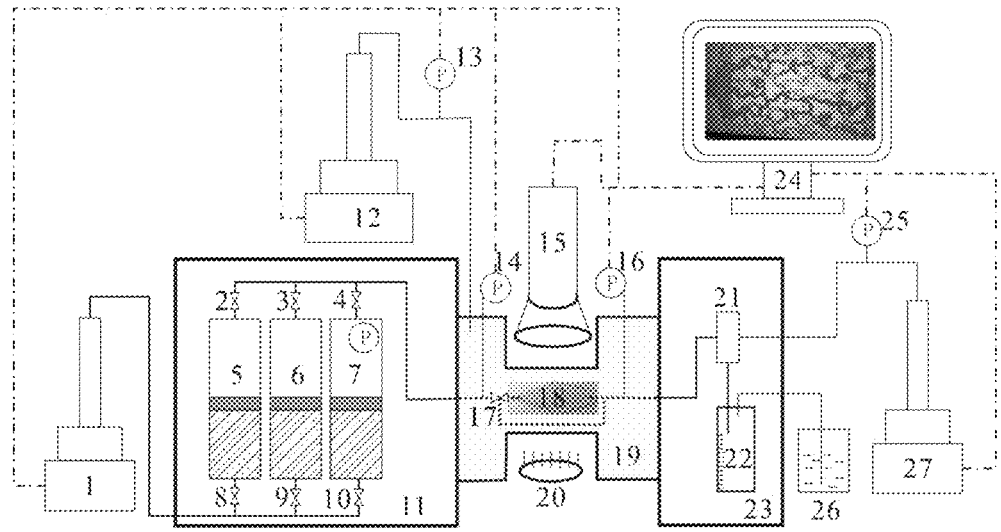
FIG. 3 illustrates a schematic diagram of a liquid sulfur-gas-water three-phase microfluidic experimental device in Example 1 of the present disclosure.
Figure 4:
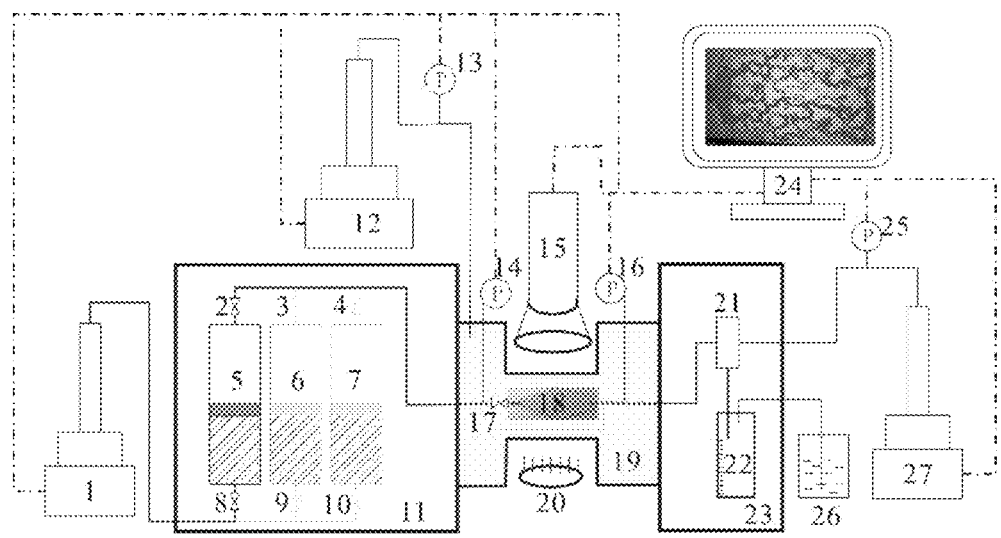
FIG. 4 illustrates a schematic diagram of a high-temperature high-pressure saturated liquid sulfur experiment in Example 1 of the present disclosure.
Figure 5:
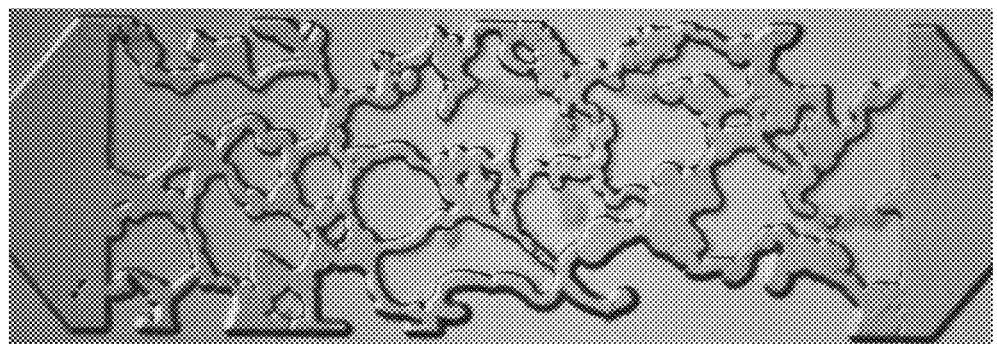
FIG. 5 is a schematic diagram showing the saturated liquid sulfur results of the microfluidic chip in Example 1 of the present disclosure.

S2, saturating the liquid sulfur at high temperature and high pressure:
(1) a microfluidic chip was mounted in a high-temperature high-pressure visible reaction kettle 19, all valves were kept in a closed state, the valve 17 was kept in communication with the microfluidic chip 18, a simulation device shown in FIG. 3 was adopted, wherein FIG. 3 illustrated a schematic diagram of a liquid sulfur-gas-water three-phase microfluidic experimental device in the present disclosure;
(2) the intermediate container 5 was filled with sulfur powder;
(3) the pressure of the back-pressure valve was set at 50 MPa, and the back pressure was kept stable through real-time detection of a pressure gauge 25;
(4) the pressure of a high-temperature high-pressure visible reaction kettle pressure 13 was correlated with the pressure of an injection end 14, and the pressure difference was kept always less than 0.2 MPa;
(5) the thermostatic heater 11, the high-temperature high-pressure visible reaction kettle 19, and the thermostatic heater 23 were heated to 150° C., and the constant temperature was kept for 3 hours;
(6) the valve 8 and valve 2 were sequentially opened, the injection pump 1 was started, and an injecting was performed in a constant pressure mode, the pressure set valve was 1 MPa lower than the pressure valve of the back-pressure valve 21 in the step (3); the injection was then switched to a constant speed mode, the speed was set to 0.05 mL/min, as shown in FIG. 4, wherein FIG. 4 illustrated a schematic diagram of a high-temperature high-pressure saturated liquid sulfur experiment in Example 1;
(7) the high-speed camera 15 was powered on to start the recording mode, the liquid sulfur saturation condition was stopped, and the saturation of liquid sulfur was terminated using an indicator that there was no obvious bubble in the microfluidic chip 18, as shown in FIG. 5, wherein FIG. 5 was a schematic diagram showing the saturated liquid sulfur results of the microfluidic chip in Example 1, as can be seen from FIG. 5, the liquid sulfur was golden yellow and filled the pores and channels of the whole etched region. The pump 1 was closed, both the valve 8 and the valve 2 were closed.

Figure 6:
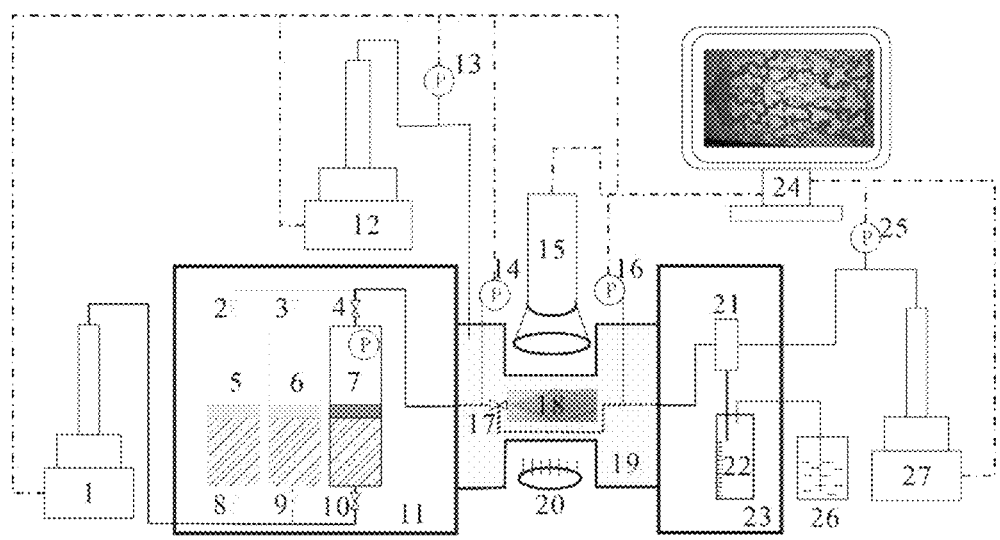
FIG. 6 is a schematic diagram of a process of cleaning a pipeline with gas in Example 1 of the present disclosure.

S3, cleaning the pipeline with nitrogen gas.
(1) on the basis of S2, all the settings were kept to maintain the state of S2;
(2) all valves were adjusted to be in a closed state, the connection route between the three-way valve 17 and the microfluidic chip 18 was closed, and the branch on the other side was simultaneously opened so that the three-way valve 17 was in direct communication with the back-pressure valve 21;
(3) the valve 10 and the valve 4 were sequentially opened, the injection pump 1 was started, and an injection was performed in a constant speed mode, and the speed was set at 0.1 mL/min;
(4) the cleaning was stopped and pump 1 was powered off until the observation that there was no obvious sulfur generated in the recovery device 22, both valve 10 and valve 4 were closed, as shown in FIG. 6, wherein FIG. 6 was a schematic diagram of a process of cleaning pipeline with nitrogen gas in Example 1.

Figure 7:
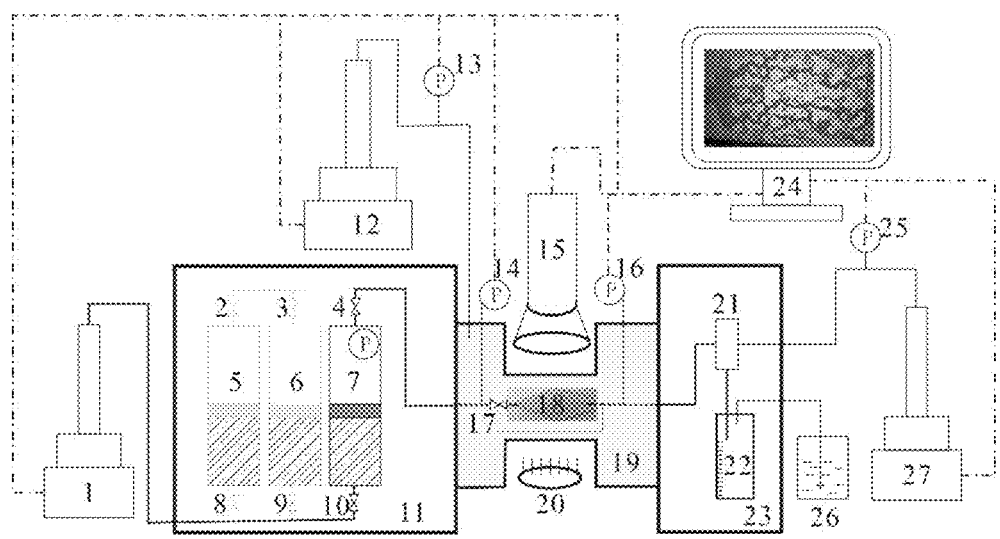
FIG. 7 is a schematic diagram of a simulation experiment of driving liquid sulfur with gas in Example 1 of the present disclosure.
Figure 8:
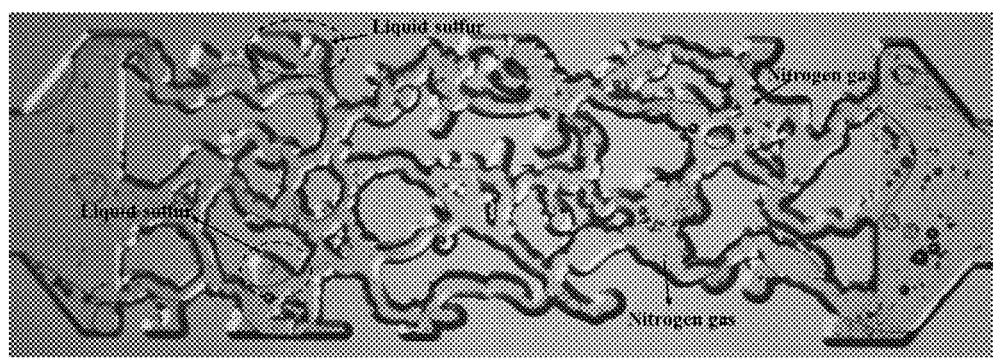
FIG. 8 illustrates a schematic diagram of the liquid sulfur-nitrogen gas two-phase flow in Example 1 of the present disclosure.

S4, simulation of gas drive liquid sulfur:
(1) on the basis of S3, all the settings were kept to maintain the state of S3;
(2) all valves were adjusted to be in a closed state, the three-way valve 17 was adjusted to be in communication with the microfluidic chip 18;
(3) the valve 10 and valve 4 were sequentially opened, the injection pump 1 was started, and an injection was performed in a constant speed mode, and the speed was set at 0.05 mL/min, as shown in FIG. 7, wherein FIG. 7 was a schematic diagram of a simulation experiment of driving liquid sulfur with gas in Example 1;
(4) the gas drive liquid sulfur simulation experiment was stopped when detecting that the microfluidic chip 18 had no change in sulfur saturation by an image analysis means, the injection pump was shut off, both the valve 10 and the valve 4 were stopped, the simulated state of gas-liquid sulfur two-phase flow was shown in FIG. 8, wherein FIG. 8 illustrated a schematic diagram of the liquid sulfur-nitrogen gas two-phase flow in Example 1; as can be seen from FIG. 8: the nitrogen gas drove the liquid sulfur to flow, the two-phase of liquid sulfur and nitrogen gas existed simultaneously, and the liquid sulfur was prone to stagnate at the blind end of the pore, the wall surface, and a portion of the throat with poor connectivity.

Figure 9:
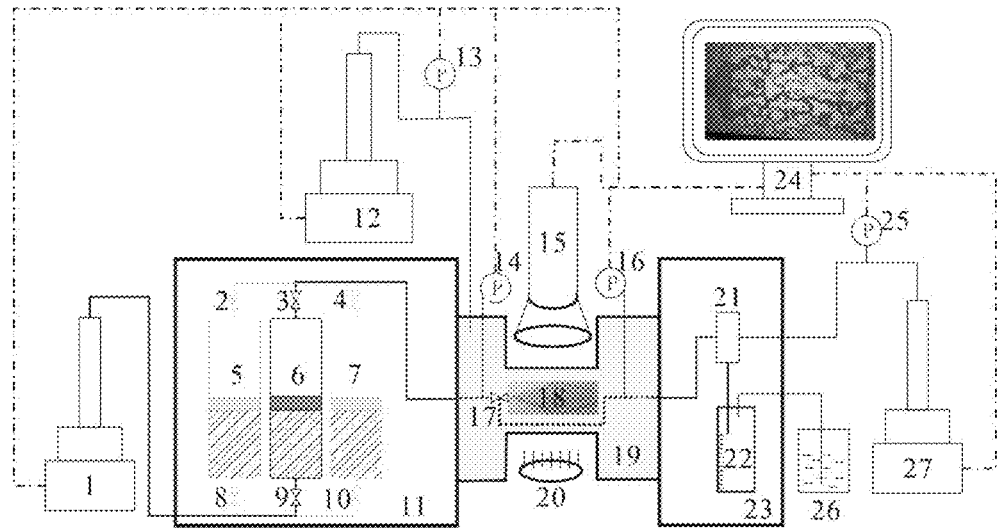
FIG. 9 illustrates a schematic diagram of the process of washing a pipeline with water in Example 1 of the present disclosure.

S5, washing the pipeline with water:
(1) on the basis of S4, all the settings were kept to maintain the state of S4;
(2) all valves were adjusted to be in a closed state, the connection route between the three-way valve 17 and the microfluidic chip 18 was closed, and the branch on the other side was simultaneously opened so that the three-way valve 17 was in direct communication with the back-pressure valve 21;
(3) the valve 9 and the valve 3 were sequentially opened, the injection pump 1 was started, and an injection was performed in a constant speed mode, and the speed was set at 0.1 mL/min;
(4) the washing operation was stopped until observing that there was no significant sulfur generation in the recovery device 22, an injection of the pump 1 was shut off, the valve 9 and the valve 3 were closed, as shown in FIG. 9, wherein FIG. 9 illustrated a schematic diagram of a process of washing pipeline with water in Example 1.

Figure 10:
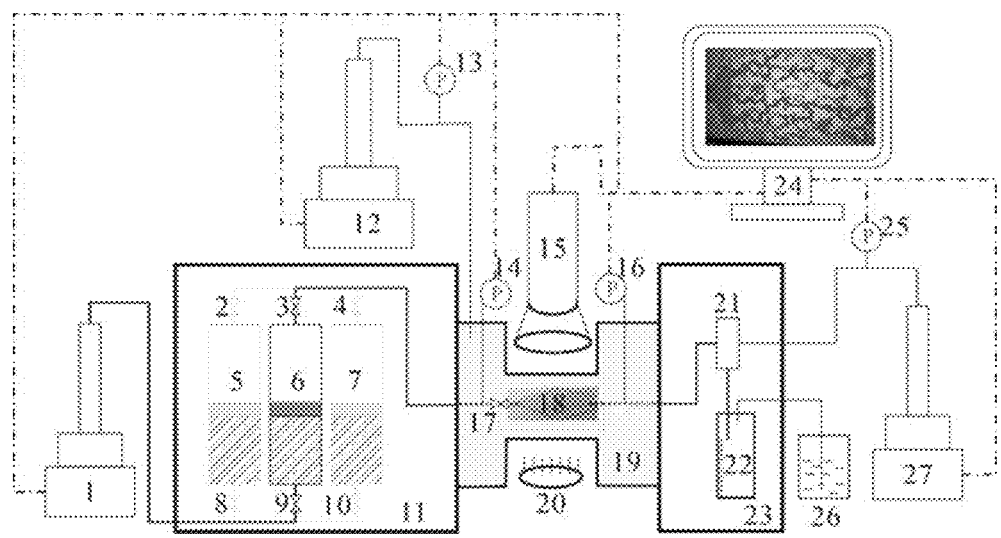
FIG. 10 illustrates a schematic diagram of a process of driving liquid sulfur with water in Example 1 of the present disclosure.
Figure 11:
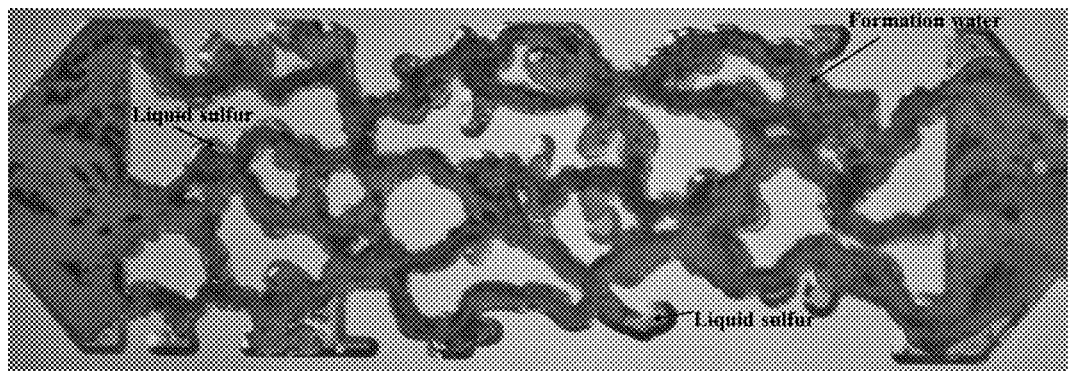
FIG. 11 is a schematic diagram showing the formation water drive gas-liquid sulfur three-phase occurrence in Example 1 of the present disclosure.

S6, liquid sulfur-gas-water three-phase simulation under the condition of driving the gas-liquid sulfur with water:
(1) on the basis of S5, all the settings were kept to maintain the state of S5;
(2) all valves were adjusted to be in a closed state, the three-way valve 17 was adjusted to be in communication with the microfluidic chip (18);
(3) the valve 9 and valve 3 were sequentially opened, the injection pump 1 was started, and an injection was performed in a constant speed mode, and the speed was set at 0.05 mL/min, as shown in FIG. 10, wherein FIG. 10 illustrated a schematic diagram of a process of driving liquid sulfur with water in Example 1;
(4) the experiment of water drive liquid sulfur was stopped when detecting that the microfluidic chip 18 had no change in sulfur saturation by an image analysis means, the injection pump was shut off, both the valve 9 and the valve 3 were stopped until only blue formation water was produced at the outlet end of the channel. The final simulated state of the water-liquid sulfur-gas three-phase flow was shown in FIG. 11, wherein FIG. 11 was a schematic diagram showing the formation water drive gas-liquid sulfur three-phase occurrence in Example 1; as can be seen from FIG. 11, the injection of water drove the nitrogen gas and the liquid sulfur to flow, a portion of the liquid sulfur still retained on the blind end and the wall surface of the pores, and a small amount of nitrogen gas stagnated in the pores.

In addition, after the simulation experiment in Example 1 was finished, the microfluidic chip was disassembled and reloaded.
(1) all valves were kept in a closed state, the connection route between the three-way valve G 17 and the microfluidic chip 18 was maintained in a closed state, the branch on the other side was in an open state simultaneously, the pump 12 was kept running, and the tracking error between the pressure gauge 13 and the pressure gauge 14 was maintained to be less than 0.1 MPa;
(2) the heating device of the high-temperature high-pressure visible reaction kettle 19 was closed, and the next operation was performed when the temperature was reduced to below 40° C.;
(3) the pressure of the back-pressure valve 21 was reduced at a depressurization rate of 1 MPa/10 min, and the microfluidic chip was then disassembled and reloaded after the pressure of the back-pressure valve was completely released.

Example 2

Figure 12:
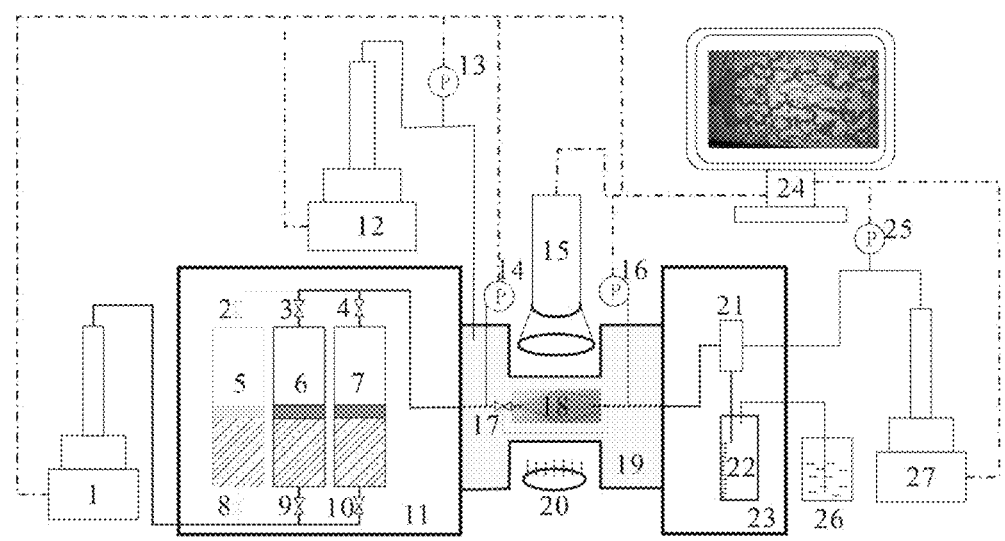
FIG. 12 is a schematic view showing the alternate injection of water and gas in Example 1 of the present disclosure.
Figure 13:
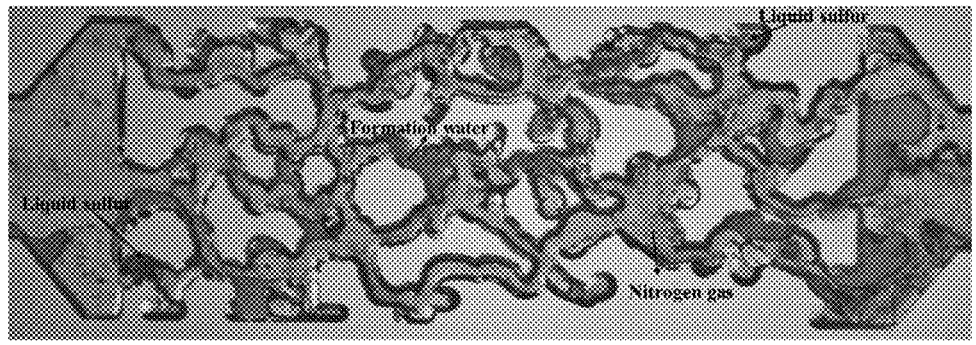
FIG. 13 is a schematic view showing the liquid sulfur-gas-water three-phase occurrence in Example 1 of the present disclosure.

After the steps "production of a microfluidic chip", "saturating the liquid sulfur at high temperature and high pressure", and "cleaning the pipeline with nitrogen gas" were performed according to the same modes as those in the S1, S2, and S3 of Example 1, the following seventh step S7 was performed:

S7, liquid sulfur-gas-water three-phase flow simulation under the condition of gas-water alternate injection:
(1) all the settings were kept to maintain the state of S3;
(2) all valves were adjusted to be in a closed state, the three-way valve 17 was adjusted to be in communication with the microfluidic chip 18;
(3) the valve 10 and valve 4 were sequentially opened, the injection pump 1 was started, and an injection was performed in a constant speed mode, and the speed was set at 0.1 mL/min, as shown in FIG. 12, wherein FIG. 12 was a schematic view showing the alternate injection of water and gas in Example 1;
(4) after the injection for 50 min, an operation of the injection pump 1 was suspended, valve 10 and valve 4 were sequentially closed, valve 9 and valve 3 were sequentially opened, the injection pump 1 was started, an injection was performed in a constant speed mode, and the speed was set at 0.1 mL/min;
(4) after the injection for 50 min, an operation of the injection pump 1 was suspended, the valve 9 and the valve 3 were sequentially closed, the valve 10 and the valve 4 were sequentially opened, the injection pump 1 was started, an injection was performed in a constant speed mode, and the speed was set at 0.1 mL/min;
(6) step (4) and step (5) were sequentially circulated, and the gas drive liquid sulfur simulation experiment was stopped after detecting that there was no change of sulfur saturation in the microfluidic chip 18 with an image analysis means, the injection pump was shut off, and all valves were closed to obtain a liquid sulfur-gas-water three-phase morphology diagram, as shown in FIG. 13, wherein FIG. 13 was a schematic view showing the liquid sulfur-gas-water three-phase occurrence prepared with the simulation method in Example 2; as can be seen from FIG. 13, the liquid sulfur was distributed at the blind end of pores and the wall surface, water was distributed on the wall surface and a portion of the pores, both the water and the liquid sulfur produced an obvious influence on the gas channel.

In addition, after the simulation experiment in Example 2 was finished, the microfluidic chip was disassembled and reloaded.
(1) all valves were kept in a closed state, the three-way valve G 17 and the microfluidic chip 18 were maintained in a closed state, the pump 12 was kept running, and the tracking error between the pressure gauge 13 and the pressure gauge 14 was maintained to be less than 0.1 MPa;
(2) the heating device of the high-temperature high-pressure visible reaction kettle 19 was closed, and the next operation was performed when the temperature was reduced to below 40° C.;
(3) the pressure of the back-pressure valve 21 was reduced at a depressurization rate of 1 MPa/10 min, and the microfluidic chip was then disassembled and reloaded after the pressure of the back-pressure valve was completely released.

Example 3

The liquid sulfur-gas-water three-phase simulation was performed with the same simulation device and simulation method as those in Example 1, except that:

in S1, the production process of a microfluidic chip:
(1) "A rock core 1 of an actual reservoir stratum of the Puguang Gas Field" was replaced with "a rock core 2 of other carbonate rock reservoir stratum"; compared with "the rock core 1 of an actual reservoir stratum of the Puguang Gas Field" in Example 1, the structure of said rock core 2 of other carbonate rock reservoir stratum had obvious heterogeneity, and the pore throat size was mainly distributed within the range of 10-800 μm;
(2) the microfluidic chip had the dimensions of 75 mm×75 mm×3 mm, and the width of both the inlet end and the outlet end was 1 mm;
(3) the Borofloat-33 glass was selected to make a model, wherein an etching region of the micro model was 4.404 mm×2.916 mm, the chip depth was an average size of 100 μm of an actual pore structure, a pore throat size was distributed between 10 μm and 800 μm.

Figure 15:
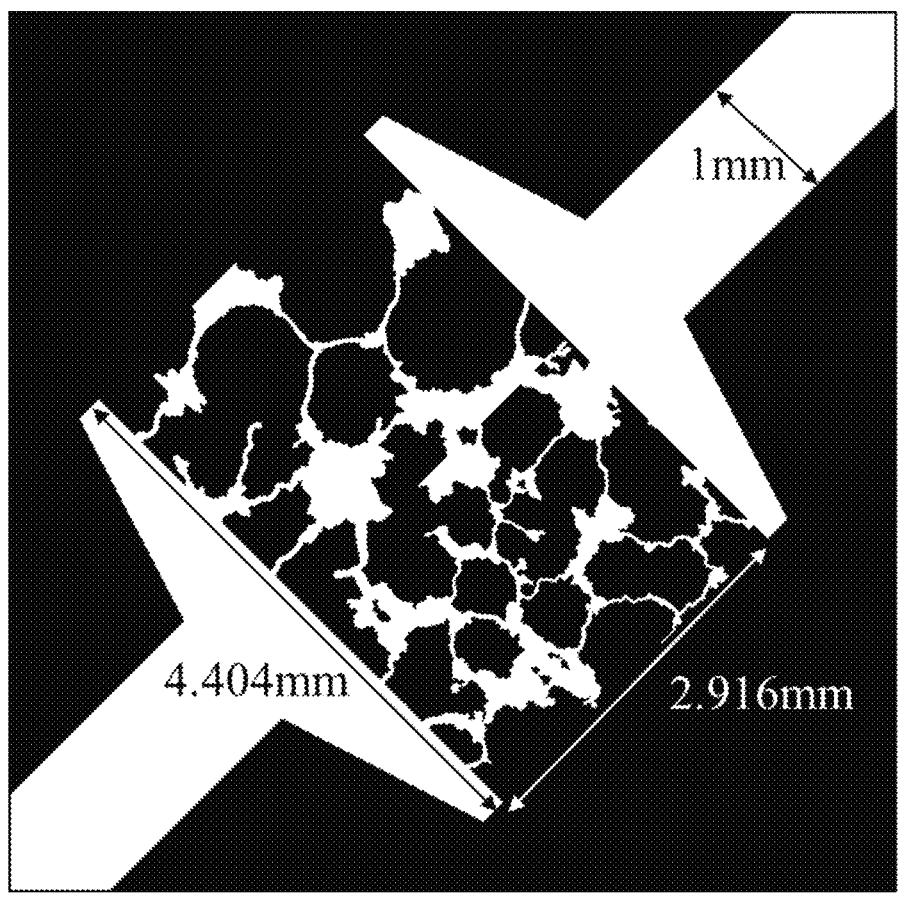
FIG. 15 illustrates a schematic diagram of the geometric morphology of an etched pore structure in Example 3 of the present disclosure.

In addition, FIG. 15 illustrated a schematic diagram of the geometric morphology of an etched pore structure in Example 3 of the present disclosure, as can be seen from FIG. 15, its pore throat size distribution was wider, and the heterogeneity was stronger.

In S2, saturating the liquid sulfur at high temperature and high pressure,
wherein:
(5) the thermostatic heater 11, the high-temperature high-pressure visible reaction kettle 19, and the thermostatic heater 23 were heated to 150° C., and the constant temperature was kept for 3 hours;
(6) the valve 8 and valve 2 were sequentially opened, the injection pump 1 was started, and an injection was performed in a constant pressure mode, the pressure was set at 50 MPa; the injection was then switched to a constant speed mode, the speed was set to 0.05 mL/min.

As a result, the simulated state of the liquid sulfur-gas-water three-phase flow can also be obtained, the liquid sulfur-gas-water three-phase existed in the macropore simultaneously, the local fine pore canal was occupied by water or gas, and a lot of the liquid sulfur was distributed on the wall surface and the blind end of the pores.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A simulation method performed in a simulation device for liquid sulfur-gas-water multiphase flow comprising:
a first simulation method:
(1) production of a microfluidic chip:
1) manufacturing a casting body slice by extracting a core rock sample from an actual reservoir stratum, and extracting a pore crack structure through microscope imaging;
2) etching the microfluidic chip according to the pore crack structure to produce a glass plate etching microscopic model;
3) gluing the other glass plate having an injection hole and a fluid extraction hole through vacuum bonding to obtain a microfluidic chip representing a real reservoir pore structure;
(2) saturating the liquid sulfur in the microfluidic chip:
placing the microfluidic chip in a high-temperature high-pressure visible reaction kettle, filling a sulfur intermediate container with sulfur powder, heating and melting the sulfur powder to a liquid sulfur state, and injecting the liquid sulfur into the microfluidic chip at high temperature until the liquid sulfur is saturated;
(3) cleaning the pipeline with nitrogen gas:
closing the connection route of the microfluidic chip and the three-way valve, and simultaneously opening the branch on the other side, so that the three-way valve is in direct communication with the back-pressure valve; nitrogen gas in the gas intermediate container bypasses the microfluidic chip along the branch and through the three-way valve, and directly flows into a recovery device through the back-pressure valve to clean the residual liquid sulfur in the processing pipeline until no liquid sulfur is generated in the recovery device; to avoid the influence of the liquid sulfur in the pipeline on the sulfur saturation in the micro-fluid control chip when the liquid sulfur is displaced by nitrogen gas;
(4) simulation of gas drive liquid sulfur:
adjusting a three-way valve, such that the three-way valve is in communication with the microfluidic chip, injecting nitrogen gas into the microfluidic chip, and acquiring a simulated state of gas-liquid sulfur two-phase flow through a high-speed camera;
(5) washing the pipeline with water:
closing the connection route of the three-way valve and the microfluidic chip, and simultaneously opening the branch on the other side, so that the three-way valve is in direct communication with the back-pressure valve; the water in the water intermediate container bypasses the microfluidic chip along the branch and through the three-way valve, and directly flows into a recovery device through the back-pressure valve to clean the residual gas in the processing pipeline until no obvious bubble is generated in the recovery device; to avoid the influence of the residual gas in the pipeline on the gas-liquid sulfur saturation in the microfluidic chip when the residual gas is displaced by water;
(6) liquid sulfur-gas-water three-phase simulation under the condition of driving the gas-liquid sulfur with water:
adjusting the three-way valve, such that the three-way valve is in communication with the microfluidic chip, injecting distilled water into the microfluidic chip, and acquiring a simulated state of liquid sulfur-gas-water three-phase flow through the high-speed camera;
or, a second simulation method:
the method is performed after steps (1) to (3) of the first simulation method:
(7) liquid sulfur-gas-water three-phase flow simulation under the condition of gas-water alternate injection:
the step is performed after steps (1) to (3), alternately opening a water intermediate container and a gas intermediate container to carry out the gas-water alternate displacement until the stable state, and acquiring a simulated state of liquid sulfur-gas-water three-phase flow through the high-speed camera;
the simulation device for liquid sulfur-gas-water multiphase flow comprising an injection unit, a high-temperature high-pressure visible reaction kettle, and a data acquisition unit;
the injection unit comprises an intermediate container, the intermediate container comprising a sulfur intermediate container, a water intermediate container, and a gas intermediate container;
the high-temperature high-pressure visible reaction kettle comprises a microfluidic chip, and the high-temperature high-pressure visible reaction kettle is connected with one end of the intermediate connector through a three-way valve G, to inject the fluid of the intermediate connector into the microfluidic chip through a connecting pipeline;
the data acquisition unit comprises a high-speed camera arranged right above the high-temperature high-pressure visible reaction kettle, and a computer connected with the high-speed camera, in order to observe the fluid changes in the microfluidic chip with real-time imaging.

2. The simulation method of claim 1, wherein the process of saturating the liquid sulfur in step (2) comprises:
1) maintaining all valves in a closed state, and keeping the three-way valve G in communication with the microfluidic chip;
2) filling a sulfur intermediate container with sulfur powder;
3) setting the pressure of the back-pressure valve to be within a range of 25-60 MPa, and keeping the back pressure stable through real-time detection with the pressure gauge;
4) correlating the pressure of a high-temperature high-pressure visible reaction kettle controlled by the pressure gauge A with the pressure of an injection end controlled by the pressure gauge B, and maintaining the pressure difference to be always less than 0.2 MPa;

5) controlling the temperature of the thermostatic heater A, the high-temperature high-pressure visible reaction kettle, and the thermostatic heater B to be within a range of 120-180° C. and preserving the constant temperature for 3-6 hours;
6) sequentially opening the valve and valve, starting the ISCO constant speed and constant pressure pump, injecting in a constant pressure mode, wherein the pressure set valve is 1-2 MPa lower than the back-pressure valve in step 3); then switching to a constant speed injection mode, wherein the speed is set to be within a range of 0.05-0.1 mL/min;
7) switching on a high-speed camera, starting a video recording mode, observing the liquid sulfur saturation condition, terminating the liquid sulfur saturation by taking an indicator that there is no obvious bubble in the microfluidic chip, stopping the injection of said ISCO constant speed and constant pressure pump, and closing the valve and the valve.

3. The simulation method of claim 1, wherein the process of cleaning the pipeline with nitrogen gas in step (3) comprises:
1) keeping all settings in the state of step (2);
2) adjusting all valves to be in a closed state, adjusting the connection route of the three-way valve and the microfluidic chip to a closed state, and simultaneously opening the branch on the other side, so that the three-way valve is in direct communication with the back-pressure valve; bypassing the microfluidic chip;
3) sequentially opening a valve and a valve, starting the ISCO constant speed and constant pressure pump, injecting in a constant speed mode, and setting the speed to be within a range of 0.1-0.5 mL/min;
4) stopping the cleaning process until observing that there is no obvious generation of liquid sulfur in the liquid sulfur recovery device, closing the injection of the ISCO constant speed and constant pressure pump, and closing the valve and the valve.

4. The simulation method of claim 1, wherein the simulation process of the gas drive liquid sulfur in step (4) comprises:
1) keeping all settings in the state of step (3);
2) adjusting all valves to be in a closed state, and adjusting a three-way valve G to be in communication with the microfluidic chip;
3) sequentially opening a valve and a valve, starting the ISCO constant speed and constant pressure pump, injecting in a constant speed mode, and setting the speed to be within a range of 0.05-0.1 mL/min;
4) stopping the gas drive liquid sulfur simulation experiment upon detecting that the sulfur-containing saturation of the microfluidic chip does not change by an image analysis means, closing the injection of the ISCO constant speed and constant pressure pump, closing the valve and the valve, and obtaining the simulated state of gas-liquid sulfur two-phase flow.

5. The simulation method of claim 1, wherein the process of washing the pipeline with water in step comprises:
(1) keeping all settings in the state of step (4);
(2) adjusting all valves to be in a closed state, adjusting the connection route of the three-way valve and the microfluidic chip to a closed state, and simultaneously opening the branch on the other side, so that the three-way valve is in direct communication with the back-pressure valve; bypassing the microfluidic chip;
(3) sequentially opening a valve and a valve, starting the ISCO constant speed and constant pressure pump, injecting in a constant speed mode, and setting the speed to be within a range of 0.1-0.5 mL/min;
(4) stopping the cleaning process until observing that there is no obvious generation of bubbles in the liquid sulfur recovery device, closing the injection of the ISCO constant speed and constant pressure pump, and closing the valve and the valve.

6. The simulation method of claim 1, wherein the process of liquid sulfur-gas-water three-phase simulation under the condition of driving the gas-liquid sulfur with water in step (6) comprises:
1) keeping all settings in the state of step (5);
2) adjusting all valves to be in a closed state, and adjusting a three-way valve G to be in communication with the microfluidic chip;
3) sequentially opening a valve and a valve, starting the ISCO constant speed and constant pressure pump, injecting in a constant speed mode, and setting the speed to be within a range of 0.05-0.1 mL/min;
4) stopping the water drive liquid sulfur simulation experiment upon detecting that the sulfur-containing saturation of the microfluidic chip does not change by an image analysis means, closing the ISCO constant speed and constant pressure pump, closing the valve and the valve, and obtaining the simulated state of liquid sulfur-gas-water three-phase flow under the water drive gas-liquid sulfur condition.

7. The simulation method of claim 1, wherein the process of liquid sulfur-gas-water three-phase flow simulation under the condition of gas-water alternate injection in step (7) comprises:
1) keeping all settings in the state of step (3);
2) adjusting all valves to be in a closed state, and adjusting a three-way valve G to be in communication with the microfluidic chip;
3) sequentially opening a valve and a valve, starting the ISCO constant speed and constant pressure pump, injecting in a constant speed mode, and setting the speed to be within a range of 0.05-0.1 mL/min;
4) after injection for 50-100 min, pausing the ISCO constant speed and constant pressure pump, sequentially closing valve and valve, opening valve and valve in sequence, starting the ISCO constant speed and constant pressure pump, and injecting in a constant speed mode, and setting the speed to be within a range of 0.05-0.1 mL/min;
5) after injection for 50-100 min, pausing the injection of said ISCO constant speed and constant pressure pump, sequentially closing the valve and the valve, opening the valve and the valve in sequence, starting the ISCO constant speed and constant pressure pump, and injecting in a constant speed mode, and setting the speed to be within a range of 0.05-0.1 mL/min;
6) circulating step (4) and step (5) in sequence, stopping the liquid sulfur-gas-water three-phase flow simulation experiment upon detecting that the sulfur-containing saturation of the microfluidic chip does not change by an image analysis means, closing the ISCO constant speed and constant pressure pump, and closing all valves.

8. A method of using the simulation method of claim 1 in the high-temperature and high-pressure gas reservoirs with high sulfur content.

9. The method of claim 8, wherein the conditions of the high-temperature and high-pressure gas reservoirs with high sulfur content comprise: the temperature condition is within a range of 120-200° C., and the pressure condition is within a range of 1-60 MPa.

10. The method of claim 9, wherein the temperature is within a range of 120-180° C., and the pressure is within a range of 20-60 MPa.

11. The method of claim 1, wherein the injection unit further comprises an ISCO constant speed and constant pressure pump, and the ISCO constant speed and constant pressure pump is connected with the other end of the intermediate container for performing the constant speed and constant pressure control on the pressure and flow rate of the fluid in the intermediate container; wherein the bottoms of the sulfur intermediate container, the water intermediate container, and the gas intermediate container are provided with a valve D, a valve E, and a valve F respectively, the valve D, the valve E and the valve F are respectively connected with the ISCO constant speed and constant pressure pump;

wherein the tops of the sulfur intermediate container, the water intermediate container, and the gas intermediate container are provided with a valve A, a valve B, and a valve C respectively, the valve A, the valve B and the valve C are connected with the three-way valve G;

wherein the three-way valve G is embedded in the high-temperature high-pressure visible reaction kettle;

wherein the three-way valve G is composed of an inlet G1 and two outlets G2 and G3, when the valve is rotated, the inlet G1 is in communication with the outlet G2, or the inlet G1 is in communication with the outlet G3; there is not the circumstance that the inlet G1 is in communication with the outlets G2 and G3 simultaneously or disconnected with the outlets G2 and G3 simultaneously;

wherein the intermediate container and the connecting pipeline are disposed in a thermostatic heater A.

12. The method of claim 1, wherein the simulation device further comprises an annular pressure unit connected with an annular pressure inlet end of the high-temperature high-pressure visible reaction kettle, the annular pressure unit provides the high-temperature high-pressure visible reaction kettle with an annular pressure;

wherein the annular pressure unit comprises a ring pressure tracking pump and a pressure gauge, the pressure gauge is disposed on a connecting pipeline between the ring pressure tracking pump and the high-temperature high-pressure visible reaction kettle;

wherein the pressure gauge includes a pressure gauge A, a pressure gauge B, and a pressure gauge C.

13. The method of claim 1, wherein the simulation device further comprises a back-pressure valve connected with the microfluidic chip;

wherein a back pressure pump is disposed at the other end of the back-pressure valve, and a pressure gauge D is arranged on a pipeline connecting the back-pressure valve with the back pressure pump, wherein the pressure gauge D is used for collecting and monitoring the back pressure.

14. The method of claim 1, wherein an outlet of the back-pressure valve is provided with a fluid recovery device, and the fluid recovery device is used for metering the volume and/or mass of the outlet-end fluid;

wherein the fluid recovery device is connected with a tail gas treatment bottle through a pipeline;

wherein the back-pressure valve and the fluid recovery device are disposed in a thermostatic heater B.

15. The method of claim 1, wherein the data acquisition unit further comprises an LED light source disposed directly below the high-temporal high-pressure visible reaction kettle;

wherein the high-temperature high-pressure visible reaction kettle further comprises a chip holder, an electric heating system, a temperature sensor, a heat conduction inner cavity, and a heat preservation outer cavity;

wherein the microfluidic chip is fixed in the heat-conducting inner cavity through the chip holder;

wherein the heat conduction inner cavity and the heat preservation outer cavity are provided with the electric heating system therein, and the electric heating system is connected to the computer through the temperature sensor to monitor temperature change in real-time.

\* \* \* \* \*